Dec. 7, 1937.   C. KINSLEY   2,101,780
ELECTROMAGNETIC TESTING OF MATERIALS
Filed Oct. 8, 1932   2 Sheets-Sheet 1
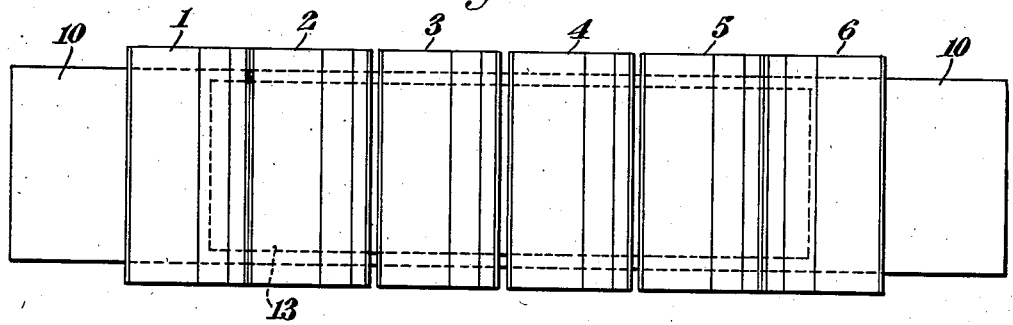
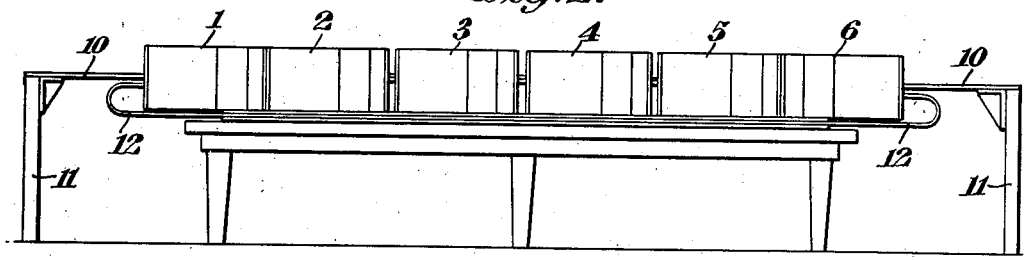
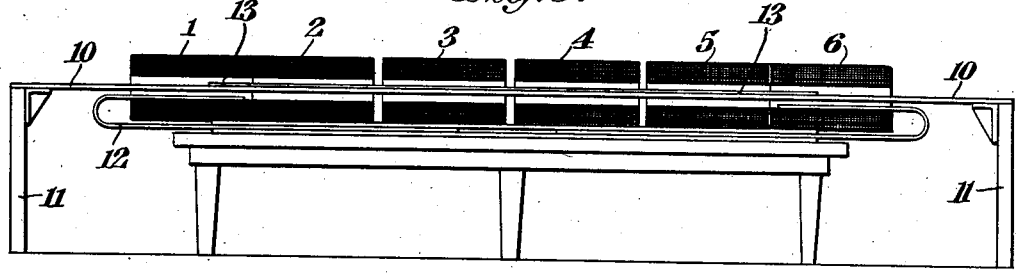
INVENTOR
CARL KINSLEY
BY
ATTORNEYS Dec. 7, 1937.  C. KINSLEY  2,101,780
ELECTROMAGNETIC TESTING OF MATERIALS
Filed Oct. 8, 1932  2 Sheets-Sheet 2
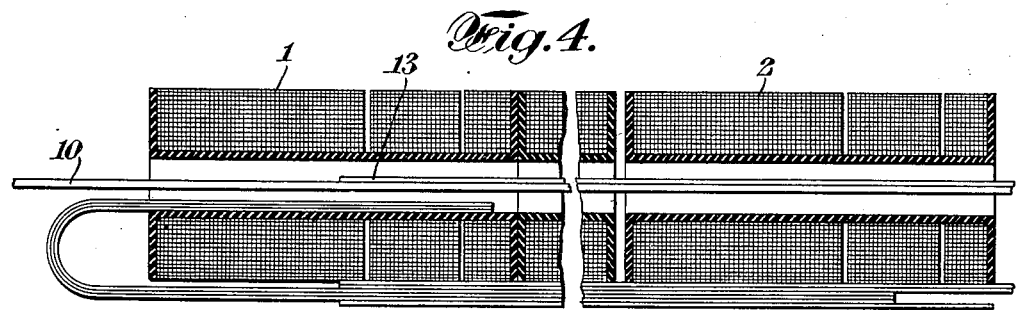
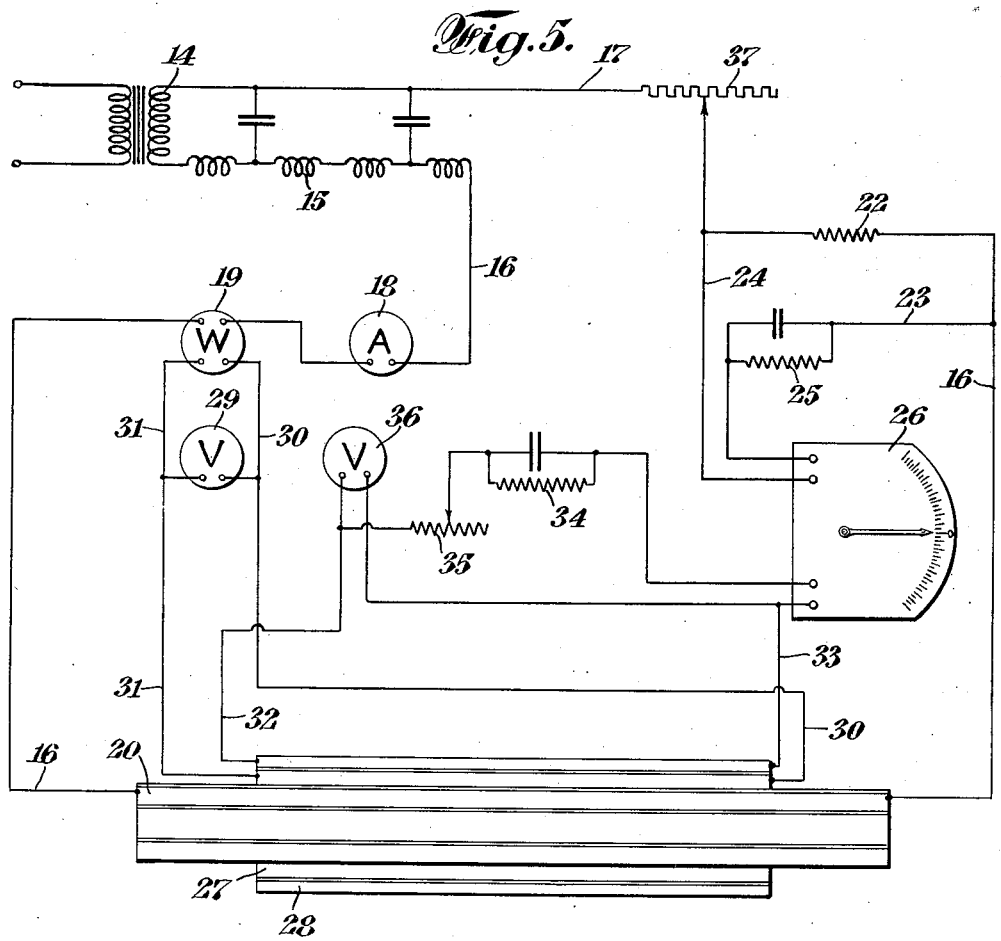
INVENTOR
CARL KINSLEY
BY
ATTORNEYS Patented Dec. 7, 1937

2,101,780

UNITED STATES PATENT OFFICE 2,101,780

ELECTROMAGNETIC TESTING OF MATERIALS

Carl Kinsley, Westfield, N. J., assignor to United States Steel Corporation, New York, N. Y., a corporation of New Jersey Application October 8, 1932, Serial No. 636,921

18 Claims. (Cl. 175—183)

This invention relates to the art of magnetic testing and more particularly to the magnetic testing of materials such as sheet metals, rods, bars, strips and the like. One of the objects of the present invention is to provide apparatus for the testing of such materials without at the same time destroying the material or rendering the same unsuitable for subsequent use in the field for which the material is tested.

Another object of the present invention is to provide apparatus suitable for the magnetic testing of whole bodies of material such as sheet, rods, bars, strips and the like.

Another object of this invention is to provide a means whereby the magnetic properties of materials entering into the construction of electrical machinery, devices and the like, may be accurately determined and known.

Another object of the present invention is to improve the magnetic testing of sheet metals.

Other objects and advantages will become apparent as the invention is more fully hereinafter disclosed.

Heretofore it has been known that all transformers, dynamos and motors have an alternating magnetic flux in a large part of their magnetic circuits. This periodic flux change must continue undiminished even though the apparatus is idling and only potentially useful. Whatever losses occur at such times cause unproductive overhead expense. When operating under full load the losses in the iron of the magnetic circuit, still form a very considerable part of the whole cost of the operation. An analysis of the iron losses enables their separation into two parts, (a) Eddy current losses, caused by parasitic currents within the material itself which are objectionable both because they heat up the material and because they prevent the magnetic flux from penetrating to all parts of the iron with equal facility; and (b) Hysteresis losses which always accompany the magnetic flux changes and are due primarily to the frictional resistance within the molecular structure. Hysteresis also develops heat energy which must be taken care of by special design in the apparatus.

It is therefore of the greatest importance to know what losses to expect in such iron products, both for the use of the designer of electrical devices and machinery and for the operator of the same who must pay the costs of operation.

In the past the long search for a satisfactory method for the predetermination of iron losses in materials entering into electrical device and machinery construction has resulted in the use of the so-called Epstein test which will give a result representing the magnetic loss in a sample of the iron when the average flux value therein is fixed at a standard value. The specifications for this test have been fixed by A. S. T. M. "Standard Methods of Test for Magnetic Properties of Iron and Steel", serial designation, A 34—24.

This method of testing is subject to certain inaccuracies and to the further objection that the actual material tested is only a representative sample of the material proposed to be used in the manufacture of the electrical device or machine, and that the material so tested is destroyed in the testing operation. The material actually employed in the manufacture of the electrical device or machine therefore has not been actually tested, and may vary widely from the sample subjected to the test.

The process of manufacture of sheet, rod, bar, strip and the like materials is such that even two adjacent sheets, for example, may differ widely in their physical and hence magnetic characteristics. It is not possible under prior art methods of testing for the manufacturer to guarantee his product as conforming to certain specifications nor for the user to be certain of the magnetic properties of the material employed in the manufacture of electrical devices, machinery and the like, or to approximate beforehand what energy losses the device or machine manufactured therefrom may show.

In accordance with the objects of the present invention I have designed an apparatus to test a whole sheet, rod, bar, strip and the like material that is proposed to be used in the manufacture of electrical devices, machinery and the like and to measure accurately the average energy losses per unit of mass in the material. This same sheet, thus tested and graded in accordance with any desired or accepted standard can later be used with confidence in the manufacture of electrical apparatus. By the practice of the present invention, which will be more fully hereinafter disclosed, errors in the actual measurements of the magnetic properties of the material are reduced, the destruction of the sample material to obtain the results is unnecessary and much of the time heretofore required for the tests is eliminated. A further advantage is that the producer of the material can in this manner keep a continual check on the quality of product and thus guarantee its character to the final user.

As a specific embodiment of the present invention I will disclose the same as it has been designed to test sheet metal material of the type and kind adapted for use in the manufacture of electrical devices such as transformers, electromagnetic switches, relays and the like.

Before further disclosing the present invention reference should be made to the accompanying drawings wherein—

Fig. 1 is a top plan view of apparatus designed for the magnetic testing of sheet iron material;

Fig. 2 is a side elevational plan view of the same;

Fig. 3 is the same as Fig. 2 partly in section;

Fig. 4 is an enlarged sectional view of the same; and

Fig. 5 is a schematic diagram setting forth the electrical circuit involved and indicating the electrical connections involved between the circuit and the testing apparatus.

In the testing of energy losses, those eddy current losses hereinbefore identified have heretofore been measured and an elementary theory regarding their measurement has been heretofore developed which is based on the assumption that the magnetic flux through the cross-section is uniform. This theoretical condition can be found only in small wires and in thin sheets. The power loss under such conditions can be expressed as follows:

$$p = \Sigma \lambda f^2 B^2 \cdot 10^{-7} \text{ in watts per cu. cm.}$$

whence $\lambda$ = Conductivity of the sheet iron;
$d$ = Thickness of the sheet in cm.;
$\Sigma = \Sigma \alpha^2$.
$f$ = Frequency of A. C.;
$B$ = Mag. flux density.

$$p = \Sigma \lambda d^2 f^2 B^2 \cdot 10^{-7}$$

(Note: Steinmetz, "Alternating Current Phenomena", 5th ed. p. 142)

It is known that hysteresis causes a power loss also. This loss may be expressed in accordance with the teachings of Steinmetz in the above reference, p. 124, as being $$p = \eta_0 f B^{1.6} \cdot 10^{-7} \text{ in watts per cu. cm.}$$

This equation is frankly empirical but it is justified by experimental tests if the magnetic flux, B, remains within the range usually employed in practice. The constant $\eta$ depends on the material and should be determined by experiment whenever two pieces of iron material being tested differ in any way in composition, heat treatment or in the degree of cold work applied thereto, etc.

It will be noted that the frequency, $f$, of the alternating current, and B, the maximum value of the magnetic induction, appear in both equations but in a different form. It is possible, therefore, to separate the two losses in any specimen by the use of different values of these quantities.

In common practice the eddy current loss is kept small by decreasing $d$, the thickness of the laminations, so that no material error will result in combining the two above losses and expressing the total loss as follows:

$$p = \eta_0 f B^{1.7} \cdot 10^{-7} \text{ watts per cu. cm.}$$

This result has been experimentally verified and the equation will be correct if B, the maximum flux density, is kept within usual values.

The power loss, $p$, can be obtained by wattmeter measurements. If either impressed E. M. F. or the current is a pure sine wave then the other quantity will be distorted. A filter may be used to maintain the current as a sine wave, $$i = I_n \sin n (\omega t - \varphi n) = I \sin \omega t, \text{ with filter and}$$
$$e = E_n \sin n(\omega t - \varphi n)$$

When employed in a wattmeter only the terms having the same frequency will cause any deflection since the other components are wattless:—

$$p = ei = EI \cos \varphi \sin^2 \omega t \text{ or } p = EI \cos \varphi$$

The measurement, therefore, becomes a very simple one and requires the maintenance of the current as a pure sine function of the fundamental frequency at such a value as to give the maximum flux density required of $B = 10{,}000$ gausses, determined by the voltmeter connected to the secondary circuit and in parallel with the potential winding of the wattmeter.

The correctness of this energy loss measurement is dependent on the assumption that the density of the magnetic flux is uniform throughout the specimens for the length of the secondary coil and for each piece in the pile, if they are stacked for use in a magnetizing coil, such as the Epstein apparatus, for example, requires. It is important to note that this is a fundamental and essential requirement. Whenever a specimen of iron can be found with a uniform magnetic flux then there are no leakage lines to or from the piece being tested and the total energy loss produced in the sample can be exactly obtained by the wattmeter measurement. An exceedingly long specimen in a similarly long magnetizing coil approximately realizes this condition. A specimen cut in the form of a ring with a circular cross-section and a uniform winding realizes the condition very nearly, if the ring has a large radius.

Both of these conditions are impractical of realization on a commercial scale particularly where it is desired to test specimens of common manufacture, such as sheet material of more or less arbitrary size, (thickness, width, length). Accordingly, I have designed apparatus utilizing the above theoretical formulae as a working hypothesis, which is suitable for the whole sheet testing of metal sheets of an arbitrary size, shape and dimension.

As has been pointed out, if the magnetic flux is uniform throughout the cross-section and also for the length of the specimen in the testing coil, then the measurement of the energy loss becomes merely a wattmeter reading similar to the measurements made with the A. S. T. M. standard specifications.

To obtain uniformity in magnetic flux throughout the cross-section and length of a specimen of arbitrary dimensional measurement it is necessary to specially design a testing coil to produce this result. The apparatus disclosed in the drawings is designed for the testing of whole sheets having the following dimensional measurements: 30 inches wide, 96 inches long and 0.014 inch thick.

The thickness or gauge of the sheet may vary within wide limits without the necessity of altering the coil specifications.

Referring to the drawings, the testing coil is shown as comprising a plurality of sections numbered 1 to 6 inclusive. The purpose of building the coil in sections will be more fully hereinafter disclosed. The coils are preferably built up upon rectangular shaped spools comprised of dielectric insulating material having an approximate length of 18 and 1⅜ inches and an inside measurement approximating 32 inches by 2¼ inches. The winding on coils numbered 2 to 5 inclusive are substantially identical and are as follows:

1st layer—146 turns of 16 DCC with 2 wires in parallel, side by side.
2nd layer—exact duplicate of the first layer.
3rd layer—23 turns of 18 DCC, evenly spaced.

The winding on coils numbered 1 and 6 are identical to that on coils 2 to 5 inclusive with a fourth layer added thereto for the purpose of compensating for the magnetic field changes in the neighborhood of the ends of the transformer sheets. This fourth winding is as follows:

Starting on the inner end of each coil, proceed by sections,

|  | Turns evenly spaced |
| --- | --- |
| First 5 cm | 10 |
| Next 12 cm | 35 |
| Last 28 cm | 77 |

After winding, the coils are exteriorly coated with suitable dielectric insulating material.

The coils thus wound are assembled in the order indicated and are connected together as follows:

The secondary turns of the 3rd layer of the four inner sections, #2, 3, 4 and 5 only are used and these are connected in series to give a total of 92 turns. One of the sets of parallel windings on layer #2 are used as secondaries, connected in series, giving a total of 584 turns. The two windings of the 1st layer are connected in parallel and then in series with the compensating winding on sections #1 and #6 and give the equivalent of a uniform winding on an endless coil so that the sheet has a substantially uniform flux strength for the whole length that is within the four inner coils upon which the secondaries are wound. The wiring diagram of Fig. 5 will hereinafter be described so that all the connections will be clear.

The coils 1 to 6 inclusive are then supported in any convenient manner about a raised platform or table top 10 comprised of dielectric insulating material, having supporting legs 11, and are spaced apart thereon substantially in the manner indicated. The upper surface of the table top 10 preferably lies substantially in a plane coinciding with the axial center along the diameter of its greater width. The spacing between coils 2 and 3, 3 and 4; 4 and 5 are approximately equal and approximates 2 inches. The spacing between coils 1 and 2; 5 and 6 approximates 1 inch. With this arrangement, the overall length of the coils approximates 109½ inches, the overall width approximates 35 inches, and the overall depth approximates 8¾ inches.

Within this coil, sheet 13 comprised of material the magnetic properties of which it is desired to measure, is placed and is substantially positioned as is indicated in dotted lines in Fig. 1, and in full lines in Figs. 3 and 4. Sheet 13 is positioned upon the platform or table 10. In order to complete the core or yoke of the electromagnetic testing device, sheets of laminated material 12 such as sheet iron and the like are provided extending around the exterior of the series of coils and underneath the same and into the opposite ends a distance sufficient at least to extend the ends into underlapping relationship with the sheet 13. It is not necessary that yoke 12 be comprised of sheet material except that it is desirable to provide for a degree of flexibility as to length and electrical characteristics of the yoke and the coil, to the end that when it is desired to introduce an additional coil or to take out one of the coils herein provided, in response to the selection of a sheet material for testing having a materially different length than that herein disclosed, the yoke also may be correspondingly increased or reduced in size, and the compensating winding on the coil correspondingly varied.

It is to be noted that by providing the table top or platform 10 extending the full interior of the spaced coils 1 to 6 inclusive the sheet 13 to be tested can always be positioned in predetermined spaced relationship with respect to yoke 12, so that no variations due to variations in the air gap therebetween occurs.

Referring to Fig. 5, the electrical equipment and wiring circuit for the testing of sheets in accordance with the practice of the present invention is disclosed. In the diagram, coils 1 to 6 (inclusive) are shown as a single coil with the windings thereon schematically separated for the purpose of facilitating the description of the wiring of the test circuit.

The testing circuit includes a source of A. C. shown here as a transformer 14 which supplies a steady impressed voltage at a constant standard frequency of 60 cycles per second. A filter 15 is used to maintain a pure sine wave. The current in the main circuit 16—17 is noted on the ammeter 18 when the secondary voltage is adjusted by the rheostat 37 to a value known to indicate a flux density, (B) of 10,000 gausses in the sheet, 13 of Fig. 3. This magnetizing current traverses the current coils of the wattmeter 19 and the windings on the first layer 20 of the testing coil shown in detail in Figs. 1, 2, 3, and 4 as being comprised of six sections electrically connected in series, and in Fig. 5 as a single coil comprised of layers. The compensating windings on the sections 1 and 6 are also in series as explained and they supply the additional magnetomotive force needed to maintain a uniform magnetic flux in the sheet being tested in spite of the reluctance added to the magnetic circuit by the air gap between the sheet and the outside keeper. There is a fixed non-inductive resistance 22 in the circuit and across its terminals is connected the circuit 23—24 which includes the compensation 25 adjusted to cancel the reactance of the fixed coils of the dynamometer 26 to which it is connected.

The potential windings of the compensated wattmeter 19 are connected by 30—31 to the secondary of the testing coils wound on the second layer 27 which has exactly the same number of terms per cm. as the primary 20, within the region covered by the secondary. Across this secondary is connected an electronic voltmeter 29 which, having 11,000 ohms per volt, can be used at all times without making any correction for the energy used in the voltmeter windings. Another secondary 28 is also employed which is connected by circuits 32—33 to the moving coils of the dynamometer 26, and its compensation 34. A series resistance 35 is provided by means of which the sensitivity of the dynamometer can be changed at will. Across the secondary is connected also the electronic voltmeter 36 which again can be used without making any correction when measurements are being made as the energy absorption by it is negligible. The wattmeter will give a rough value of the energy loss in the sheet covered by the secondary, comparable to the value obtained by the measurement of the diameter of a rod with a foot rule, while the dynamometer will give an exact value of the energy loss difference between the sheet being tested and a fixed standard thus being comparable to the measurement with a micrometer of the difference between the diameter of a rod and that of a fixed standard test piece.

Two methods have been used in making the measurements but the second method was found to be the better to use.

The first method devised involved the measurement of the energy losses in the case of a sample sheet picked either at random or else chosen on account of some special quality. The dynamometer was then balanced by introducing in the test circuit an extra wave which balanced the in-phase component of the testing current in both amplitude and phase. This extra wave was obtained from a phase shifting transformer. The substitution of a second specimen for the first one, without changing the balancing wave caused the dynamometer to give a deflection. If the difference was small then the sensitivity of the dynamometer could be greatly increased until the difference in amplitude and phase could be read with as great accuracy as desired.

The second method devised obtains the desired sensitivity in the dynamometer by using a mechanical balance in the dynamometer instead of the electrical one described in the first method. The dynamometer, at first deflected by the energy loss in the first specimen, may be brought back to zero by rotating the support of the suspension and thereby introduce a mechanical torque which balances the torque caused by the electrical unbalance. This, in effect, gives a displaced zero—or suppressed zero—which may be exactly evaluated. It was found that an equivalent of 70 cm. deflection gave the most easily used sensitivity and caused the differences found between different sheets to give a range of dynamometer deflection from −9 cm. to +11 cm., or the equivalent of 61 cm. to 81 cm., when the sheet chosen as the comparison sample caused the dynamometer to read 0, or the equivalent of 70 cm. In other words, the suspension was given a torque equivalent of 70 cm. by the second sheet. It was found that this value may be made substantially constant to within + or − 0.1 cm. with a normal amount of care in adjusting the magnetizing current to the value which gave a fixed minimum induction of 10,000 gausses. The stability of this method of measurement will be found to be surprisingly satisfactory as the measurements are repeated from day to day for weeks at a time. This will check, at the same time, the constancy of the sheet, the permanency of the magnetizing coil and the stability of the electrical circuits. The experimental error will be only a small fraction of that found with any wattmeter method of direct measurement.

The accuracy of the dynamometer measurements may be checked with calibrated wattmeters, ammeters and voltmeters together with Wheatstone bridge measurements of non-inductive circuits and of inductive circuits with no iron present, using both alternating and direct currents if desired.

The flux density in the sheets may be determined by using separately the secondaries on each of the sections which completely covered a portion of the sheet. These average values for the four 50 cm. sections of the sheets were supplemented by using a close fitting testing coil of 35 turns and 1 inch in length by 31 inches in width which was moved along the sheet inside of the magnetizing coil and from whose induced voltage the average value of the magnetic induction could be calculated throughout the entire length of the sheets upon which it was used.

The magnetic field would be more uniform if the sections had been mounted with no spaces between the coils but the practical testing in mill operations require the spaces between the coils to provide against certain operating emergencies. As may be anticipated there is a measurable variation in the flux density between the center of a section and the center of the space between sections. This may be shown by a series of measurements made by a 1 inch testing coil plotted together with the values obtained with the four testing coils to give the average values for a whole section. Part of the variation thus obtained may be noted as being due to the lack of complete uniformity in the sheet. It was found, however, that the complete difference between the flux density under the center of a section and the center of the space between sections was less than 2½ per cent and this was well within the value of the constancy required for commercial measurements. The final value of the average energy loss would be affected by the variation in the flux value by less than $\frac{1}{10}$ per cent. As the irregularity increases the error in the energy loss values becomes rapidly larger.

The above measurements may be verified by using all types of sheets available of gauges #26 and #29 which cover the complete range of hysteresis and permeability variations found, together with all of the mechanical irregularities which occur in mill operations. The requirement that a uniform flux be present in the sheet is satisfactorily met by the apparatus described.

In the practice of the present invention sheet 13 is placed in position within the coils 1 to 6 inclusive upon platform 10. The cross-section of the sheet is calculated from its weight, length, breadth and density. The secondary voltage required to represent a flux value of 10,000 gausses is computed from the equation $$E = 4.44 \, F f \, n \, a \, B \, 10^{-8} \text{ volts}$$

F = Form factor
$f$ = Frequency
$n$ = Number of turns of secondary
$a$ = Cross sectional area of sheet in sq. cm.
B = Magnetic flux density of 10,000 gausses Note: $F = \dfrac{\text{effective voltage}}{\text{average value}}$ $$= \dfrac{\sqrt{\dfrac{1}{T}\int_0^T e^2 dt}}{\dfrac{2}{T}\int_0^{\frac{T}{2}} e\, dt}$$

(p. 106 Lawrence "Principles of A. C.")

(Steinmetz—A. C. Phenomena, 5th ed. p. 17 and A. S. T. M. "Standard Methods", serial designation, A34—24). The magnetizing circuit is energized and the electronic voltmeter is brought to the calculated value to indicate 10,000 gausses and is maintained unchanged during the energy loss measurement.

The measurements by the so-called Standard Method (Epstein test) are made on 10 kg. of material cut into strips 50 cm. by 3 cm. A similar measurement can be made on the whole sheet with the wattmeter by the apparatus of the present invention. From the weight of the sheet the usual expression for loss in watts per pound of material can be calculated. The actual measurement includes the loss in only the part of the sheet covered by the secondary coil so the weight used in the calculation will be the whole weight multiplied by a constant factor, the length in the secondary coil divided by the whole length of the sheet.

The measurement by the dynamometer is made in a similar manner except that the accuracy of the measurement can be greatly increased by the device of shifting the zero of the instrument by rotating the suspension. This is usually an amount equivalent to the torque which would give a zero change of 100 cm. At scale distance of 125 cm. this would amount to an angular rotation of the torsion lead of 46 degrees. If then the sensitivity of the dynamometer is adjusted by means of the series resistance until the energy loss chosen as the standard for comparison is just able to return the dynamometer to its normal zero then the divergence of any sheet from that comparison value will cause a deflection on one side of zero which will very exactly measure the amount of the difference.

$$E_1 = \frac{E_o(D \pm d)}{D}$$

E=Total energy loss in sheet 1.
$E_o$=Energy loss to give 100 cm. deflection.
D=100 cm. deflection.
d=deflection difference from the normal zero.

In this way a highly sensitive dynamometer which shows a deflection of +1.2 cm. with one sheet and +2.2 cm. with another will indicate a difference between the two sheets of $$\frac{102.2 - 101.2}{100} = \frac{1}{100}$$

or 1 per cent of the standard used for comparison. With stable conditions the readings can be duplicated to ±0.1 cm. or $\frac{1}{10}$ of 1 per cent.

A switch—not shown—connects the dynamometer to a dry cell so arranged as to keep the dynamometer on its scale zero when it is not in use.

In grading the material it may be convenient to change the sensitivity of the dynamometer so as to have it read 0 on the scale for each 5 per cent change in the energy loss in the sheet.

The energy losses, obtained as above will show with great exactness the relative values for different sheets and the results thus obtained will indicate the class to which the sheet belongs as it would be graded if it was cut up and the energy loss measured by the usual Epstein test.

While the present invention has been described with particularity with respect to the whole-sheet testing of materials, the same may be adapted to be used in the measuring of magnetic permeability. With the Epstein method of measurement it has not been possible to obtain the permeability of the iron since the reluctance of the magnetic circuit is not constant. The permeability is defined as the ratio of the magnetic flux to the magnetizing force producing it. The specimen must be in such a form and used in such a way that the reluctance of the magnetic circuit is caused only by the magnetizing processes in the iron itself. The measurement of the permeability is usually made on a ring sample with a D. C. galvanometer in order to meet the above conditions. The importance of knowing the permeability of the material will be realized when it is understood that all of the magnetizing windings employed in the construction of electrical apparatus must be calculated on the basis of the assumed permeability. The machine finally produced may not at all confirm the calculations by its operating test and then it may be necessary to rewind it or modify it in some other way in order to produce the desired results.

The whole-sheet method of measurement, as hereinbefore defined, provides a means for directly measuring the permeability of the material before it is used in the construction of electrical machines thus giving to the designer the exact value of the permeability to use in his design of the apparatus. The magnetizing current used in the whole-sheet test, after the voltage has been adjusted so as to correctly give the desired flux value, can be used to calculate the permeability. On account of the difficulty in making the measurement with the usual methods there is no standard practice in the calculation and use of this constant.

Let $\Phi = Ba = H\mu a$
$H = 4\pi N_o I/10$
$B = 4\pi \mu N_o I/10$
or $\mu = \dfrac{10B}{4\pi N_o I}$ $\Phi$=The total magnetic flux.
B=Magnetic flux, here used as 10,000 gausses.
H=Magnetizing force.
a=Area of cross section in sq. cm.
$N_o$=Number of turn of winding per cm., in the uniform field.
$F\lambda$=Factor approximately correcting for energy loss differences and for variation in higher harmonics.
I=Current in amperes.
$I_{eff} = \bar{I}$=Virtual value of current.

If the impressed P. D. is a sine wave then B is also a sine wave and the magnetizing current, I, becomes distorted. The permeability, $\mu$, is then a complex quantity which is usually considered as the slope of the B—H curve, or since $H \propto I$ $$\mu \propto \frac{dB}{dI}$$

If only the fundamental of the distorted current wave is used—with a correcting factor to approximate the effect produced by the distortion—$F\lambda$= .955—then $\mu$ becomes a constant. This can be used in the design of electrical apparatus and it also becomes a method for expressing the relative value of the sheets for their primary purpose of obtaining a large flux density from a small magnetizing force. The correction factor, $F\lambda$, is not large since the quadrature component of the current in such a circuit, used only for the magnetization of high permeability sheets having low values for hysteresis and eddy current losses, is far greater than the inphase component.

In the case of the magnetizing coil whose details of construction and winding are given herein the value of $\mu$ becomes $$\mu_{av} = \frac{182}{I_{eff}}$$

$I_{eff}$ was found to vary from .210 to .350 amperes for different pieces of transformer iron and electrical sheet.

Therefore, $\mu_{av}$, varied from 870 to 520. Two machines of the same design and dimension of core would show a difference in the flux density of nearly 1 to 2 with the same magnetizing current and whereas one machine might be a great success the other could be a complete failure.

It is believed that such a constant as has been defined above would be of great value to the designers of electrical apparatus as it would give a close approximation to the relative permeabilities of different sheets as now ordinarily expressed by the D. C. method of measurement. This constant might be given a distinctive name or might be called merely "the A. C. average permeability" A. C. $\mu$ (or $\mu$ ac).

Having broadly and specifically defined the present invention it is believed apparent that many modifications and departures may be made therein without departing essentially from the nature and scope thereof as set forth in the following claims.

What I claim is:—

1. In apparatus for the magnetic testing of materials, means to obtain a substantially uniform magnetic flux throughout a known mass of said material, said means including an electromagnetic coil adapted to extend beyond the ends of the said mass to be tested, compensating windings adjacent the ends of said coil to substantially equalize the magnetic flux in said mass, a keeper for said coil, said keeper having a gap disposed interiorly of said coil over which the said mass of material to be tested may be bridged, and means to pass a determined magnetizing current through the said coil.

2. In apparatus for the magnetic testing of materials, means to obtain a substantially uniform magnetic flux throughout a known mass of said material, said means including an electromagnetic coil adapted to extend beyond the ends of the said mass to be tested, compensating windings adjacent the ends of said coil to substantially equalize the magnetic flux in said material, a keeper for said coil, said keeper having a gap disposed interiorly of said coil over which the said mass of material to be tested may be bridged, means to maintain said mass at a uniformly spaced distance from the keeper ends across said gap, and means to pass a determined magnetizing current through the said coil.

3. Apparatus for the testing of whole sheets of magnetic materials comprising an electromagnet coil, a source of alternating current therefor, an electric circuit including an ammeter to pass said current through the coil, a substantially plane surfaced platform extending through the coil at substantially its axial center, a yoke for said coil with a gap interiorly of the coil adapted to be bridged by the sheet of material to be tested, the said yoke and gap portion thereof being disposed below but adjacent the said platform, means to obtain a substantially uniform distribution of the electromagnetic flux of said coil throughout the entire cross-section and length of said whole sheet, and means to obtain an accurate wattmeter measurement of the energy losses in said sheet while the magnetic flux is present therein.

4. Apparatus for the testing of whole sheets of magnetic materials comprising an electromagnetic coil, a source of alternating current, an electric circuit including an ammeter to pass a determined current through said coil, a substantially plane surfaced platform extending through the coil at substantially its axial center, a yoke for said coil with a gap interiorly of the coil adapted to be bridged by the sheet of material to be tested, the said yoke and gap portion thereof being disposed below but adjacent the said platform, means to distribute the electromagnetic flux of said coil substantially uniformly throughout the entire cross-section and length of said whole sheet, an electric circuit including a dynamometer to measure the energy losses in said sheet in watts while the magnetic flux is present therein, and means to increase the sensitivity of said dynamometer to obtain an accurate wattmeter measurement of the said energy losses.

5. Apparatus for the testing of whole sheets of magnetic materials comprising a segmented electromagnetic coil electrically connected in series, a source of alternating current, an electric circuit including an ammeter to pass a determined magnetizing current through the coil, a substantially plane surfaced platform extending through the coil at substantially its axial center, a yoke for said coil with a gap interiorly of the coil adapted to be bridged by the sheet of material to be tested, the said yoke and gap portion thereof being disposed below but adjacent the said platform, means to distribute the electromagnetic flux of said coil uniformly throughout substantially the entire cross-section and length of said whole sheet, and means to obtain an accurate wattmeter measurement of the energy losses in said sheet while the magnetic flux is present therein.

6. In apparatus for the magnetic testing of materials, an electromagnetic coil adapted to extend beyond the ends of the material to be tested compensating windings adjacent the ends of said coil adapted to uniformly distribute the magnetic flux of said coil throughout substantially the entire cross-section and length of said material.

7. In apparatus for the magnetic testing of materials, an electromagnetic coil adapted to extend beyond the ends of the material to be tested, said coil including compensating windings adjacent the ends thereof adapted to uniformly distribute the magnetic flux throughout substantially the entire cross-section and length of said material, means to energize said coil with a determined magnetizing current, and means to measure the energy losses in said material while the said uniform magnetic flux is present therein.

8. The method of determining the energy loss characteristics of a mass of magnetic material which comprises forming a closed magnetic path including a determined length of said material, inducing a determined alternating magnetic flux in said path, uniformly distributing the said flux throughout the cross-section of said determined length of the material, superposing upon the remainder of the said path additional magnetization adapted to provide a reaction upon the said determined length of the specimen which is substantially identical to that reaction which would exist if the magnetizing coil employed in inducing said magnetic flux in the said path were a part of a uniformly wound endless coil enclosing said path and the said specimen were a part of an endless core of uniform cross-section and magnetic properties within said endless coil, adjusting the induced magnetic flux to a desired maximum flux density, and then determining the average energy losses occurring in a known portion of the said determined length in terms of watts per unit of mass.

9. The method of determining the energy loss characteristics of magnetic material which comprises forming a closed magnetic circuit including a determined length of said material, inducing an alternating magnetic flux in said circuit, uniformly distributing said flux throughout substantially the entire length and cross-section of the said material included within said closed magnetic circuit, superposing additional magnetization upon the remainder of said closed magnetic circuit at least sufficient to produce a magnetization in said determined length which is substantially identical to that magnetization which would exist if the said closed magnetic circuit was comprised entirely of said material and formed an endless core of uniform cross-section disposed within an endless magnetizing coil having uniform windings of the same number of turns per unit length as in the magnetizing coil inducing said alternating magnetic flux, adjusting the magnetic flux in said determined length to a desired maximum flux density, measuring the voltage induced by said maximum flux over a known portion of said determined length of the material, and determining the average energy losses occurring in said known length of the material while said uniform maximum flux is present therein in terms of watts per unit of mass of said material.

10. A magnetic testing device comprising a tubular magnetizing coil, an external yoke member provided with a space gap through the core of said coil and located wholly within said core forming an external path for magnetic flux about the coil, means to dispose a specimen to be tested in bridging relation across the said space gap of the yoke, means to energize the coil with an alternating current, means to adjust the said current to obtain a determined maximum flux density in the specimen, means to obtain a substantially uniform distribution of the magnetic flux throughout the cross-section and length of the specimen enclosed by the coil and means to measure the energy losses occurring in a portion of the said length of the specimen.

11. In the device of claim 10, said means to obtain a substantially uniform distribution of the magnetic flux throughout the cross-section and length of the specimen enclosed by the coil comprising compensating windings disposed adjacent each end of the coil and enclosing the overlapping ends of the specimen and the yoke and means to energize said compensating windings to impress a magneto-motive force across the said ends at least sufficient to overcome the reluctance of the space gap between said overlapping ends.

12. In the device of claim 10, said means to obtain a substantially uniform distribution of the magnetic flux throughout the cross-section of a determined length of the specimen enclosed by the coil comprising compensating windings disposed on each end of the coil and enclosing the overlapping end portions of the specimen and the yoke and means to energize said windings to supply sufficient additional magneto-motive force to the yoke to insure substantially uniform flux distribution in the specimen throughout substantially the entire length of the specimen enclosed by the said coil.

13. In the device of claim 10, said means to measure the energy losses occurring in said determined length comprising a secondary winding covering a portion of the length of the specimen enclosed by said coil, an electrical circuit including a dynamometer having one coil thereof across said secondary and the other coil thereof electrically in series with the magnetizing coil, the watt loss per unit mass of the specimen being tested being determined by calculation from the meter reading on said dynamometer.

14. In the device of claim 10, said means to adjust the magnetizing current to obtain a determined maximum flux density in the specimen comprising a voltmeter electrically connected across a secondary winding on said coil covering a portion of the length of the specimen and a variable resistance electrically in series with the said magnetizing coil to vary the current input to the coil to obtain a determined voltage reading on said voltmeter representative of a determined maximum density of the magnetic flux in the specimen.

15. An electromagnetic testing device comprising a tubular electromagnetic coil having a primary winding extending the length of the coil and a secondary winding extending over a known portion of the length intermediate the ends of the coil, and compensating windings disposed over each end of the primary windings, said compensating windings being electrically connected in series with said primary winding to produce a magnetizing effect on a specimen disposed within the tubular core of the coil substantially equivalent to that which would be present if the specimen were a part of an endless core of uniform cross-section and the said coil were a uniformly wound endless coil enclosing said core and were provided with substantially the same number of turns per unit of length as provided in the said primary winding.

16. An electromagnetic testing device comprising a tubular electromagnetic coil having a primary winding extending the length of the coil and a secondary winding extending a known portion of the length of the coil but intermediate the ends thereof and compensating windings disposed on opposite ends of the said primary winding, means to electrically connect the primary winding and the said compensating windings in series with a source of alternating current to set up a magnetic field in the hollow core of the said coil, the compensating winding being adapted to add sufficient magneto-motive force to the said field to insure therein a uniform density which is substantially identical to that of an endless coil having the same number of turns per unit of length as provided in the said primary winding.

17. An electromagnetic testing device comprising a tubular electromagnetic coil having a primary winding extending the length of the coil and a secondary winding extending a known portion of the length of the coil but intermediate the ends thereof and compensating windings disposed on opposite ends of the said primary winding, means to electrically connect the primary winding and the said compensating windings in series to a source of alternating current to set up a magnetic field in the hollow core of the said coil, the number of turns on said compensating winding being adapted to impose sufficient additional magneto-motive force to the said field to insure a uniform density in the said field which is substantially identical to that of an endless coil having the same number of turns per unit of length as provided in the said primary winding, and means to adjust the magnitude of the said alternating current from said source to obtain a determined maximum flux density in said field.

18. An electromagnetic testing device comprising a tubular electromagnetic coil having a primary winding extending the length of the coil and a secondary winding extending a known portion of the length of the coil but intermediate the ends thereof and compensating windings disposed on opposite ends of the said primary winding, a yoke element forming a closed magnetic path about the exterior of the coil but provided with a space gap extending through the said core with the ends of the yoke located within the said compensating windings, means to sustain a specimen to be tested in bridging relation across the said space gap, means to electrically connect the primary winding and the said compensating windings in series to a source of alternating current to set up a magnetic field in the hollow core of the said coil, and in the closed magnetic circuit formed by said yoke and specimen, the number of turns on said compensating windings being adapted to impress on said field additional magneto-motive force at least sufficient to produce a flux density in said field which is substantially identical to that of an endless coil having the same number of turns per unit of length as provided in the said primary winding, means to adjust the magnitude of the said alternating current from said source to obtain a determined maximum flux density in said field and means to obtain a wattmeter measurement of the energy losses in the length of said specimen covered by the said secondary while said maximum flux is present therein.

CARL KINSLEY.